US012756495B2

(12) United States Patent
Huang-Fu et al.

(10) Patent No.: US 12,756,495 B2
(45) Date of Patent: Oct. 6, 2026

(54) COMMUNICATION APPARATUS AND METHODS FOR MULTIMEDIA ADAPTATION IN A COMMUNICATION APPARATUS COMMUNICATING WITH A NETWORK DEVICE IN A WIRELESS NETWORK VIA A COMMUNICATION LINK

(71) Applicant: MEDIATEK INC., Hsin-Chu (TW)

(72) Inventors: Chien-Chun Huang-Fu, Hsinchu City (TW); Chiao-Chih Chang, Hsinchu City (TW); Yuan-Chieh Lin, Hsinchu City (TW); Sheng-Yi Ho, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 828 days.

(21) Appl. No.: 17/824,874

(22) Filed: May 25, 2022

(65) Prior Publication Data

US 2022/0407618 A1 Dec. 22, 2022

Related U.S. Application Data

(60) Provisional application No. 63/232,283, filed on Aug. 12, 2021, provisional application No. 63/213,310, filed on Jun. 22, 2021.

(51) Int. Cl.
*H04L 1/00* (2006.01)
*H04L 1/20* (2006.01)
*H04W 36/00* (2009.01)

(52) U.S. Cl.
CPC .............. *H04L 1/0014* (2013.01); *H04L 1/20* (2013.01); *H04W 36/0058* (2018.08); *H04W 36/008375* (2023.05)

(58) Field of Classification Search
CPC .... H04L 1/0014; H04L 1/20; H04W 36/0058; H04W 36/008375; H04W 24/08; H04W 24/10; H04B 17/373; H04N 19/164
See application file for complete search history.

(56) References Cited

U.S. PATENT DOCUMENTS

2011/0093605 A1* 4/2011 Choudhury ........... H04L 65/613 709/231
2012/0092991 A1* 4/2012 Jeong ...................... H04L 67/04 370/235

(Continued)

FOREIGN PATENT DOCUMENTS

CN 101627632 1/2010
CN 107950058 4/2018

(Continued)

*Primary Examiner* — Sujoy K Kundu
*Assistant Examiner* — Samuel Dilan Rutnam
(74) *Attorney, Agent, or Firm* — Winston Hsu

(57) ABSTRACT

A communication apparatus includes a radio transceiver, an application processor and a modem processor. The radio transceiver transmits or receives wireless signals to or from a network device in a wireless network to communicate with the network device via a communication link. The application processor is configured to run one or more application programs. The modem processor is coupled to the radio transceiver and the application processor and configured to perform operations including: evaluating a future condition of the communication link according to at least one communication parameter or at least one communication event to obtain an evaluation result; and sending a first indication to the application processor to inform the application processor of the evaluation result. Responsive to reception of the first indication, the application processor is further configured to perform operation including: adapting a codec for multimedia processing of data received from the network device.

22 Claims, 11 Drawing Sheets

(56) References Cited

U.S. PATENT DOCUMENTS

| | | | |
|---|---|---|---|
| 2014/0362160 | A1 | 12/2014 | Venkatachalam Jayaraman et al. |
| 2017/0195932 | A1* | 7/2017 | McDiarmid .......... H04W 36/26 |
| 2018/0184309 | A1* | 6/2018 | Bhardwaj ........... H04W 72/542 |
| 2020/0100153 | A1* | 3/2020 | Huang ................ H04W 68/005 |
| 2021/0168188 | A1 | 6/2021 | Fujishiro |
| 2022/0286899 | A1* | 9/2022 | Ma ........................ H04W 24/10 |

FOREIGN PATENT DOCUMENTS

| | | | | |
|---|---|---|---|---|
| CN | 110022602 | | 7/2019 | |
| CN | 112640390 | A | 4/2021 | |
| EP | 3 419 346 | A1 | 12/2018 | |
| WO | WO-2021026509 | A1 * | 2/2021 | ........... H04L 41/147 |
| WO | WO-2023013001 | A1 * | 2/2023 | ............ H04W 16/28 |

* cited by examiner

COMMUNICATION APPARATUS AND METHODS FOR MULTIMEDIA ADAPTATION IN A COMMUNICATION APPARATUS COMMUNICATING WITH A NETWORK DEVICE IN A WIRELESS NETWORK VIA A COMMUNICATION LINK

CROSS REFERENCE TO RELATED APPLICATIONS

This application claims the benefit of U.S. Provisional Application No. 63/213,310, filed on Jun. 22, 2021. Further, this application claims the benefit of U.S. Provisional Application No. 63/232,283, filed on Aug. 12, 2021. The contents of these applications are incorporated herein by reference.

BACKGROUND

Video streaming, e.g., video on demand, is a popular service where display buffer related mechanisms are utilized to mitigate the jitter, packet delay and packet loss. Following the video streaming, cloud-based interactive services are emerging. Cloud-based interactive services include cloud gaming, cloud VR, cloud AR . . . etc. The cloud-based interactive services usually require a cloud server.

A cloud server typically provides video rendering of the game for a gaming display device thereby allowing a user of the device to play the game. The cloud server creates each video frame required to play the game, compresses the entire frame through video encoding and transmits a bitstream of packets corresponding to the entire frame over associated transmission networks to the display device. In this process, the video encoding portion currently delays the start of video frame transmission until the video frame is fully encoded. This delay often introduces viewer display latencies that reduce the gaming experience. Additionally, the connection between the gaming display device and the network may sometimes be downgraded in quality or even interrupted due to some network conditions, resulting in transmission packet loss, video frame quality reduction and more serious display latencies, which also degrades the gaming experience.

Since there is a strict latency requirement in cloud-based interactive services, methods for intelligent multimedia codec adaption to enhance the transmission quality between the service receiving device and the network and improve the user experience are highly required.

SUMMARY

According to an embodiment of the invention, a communication apparatus comprises a radio transceiver, an application processor and a modem processor. The radio transceiver transmits or receives wireless signals to or from a network device in a wireless network to communicate with the network device via a communication link. The application processor is configured to run one or more application programs. The modem processor is coupled to the radio transceiver and the application processor and configured to perform operations comprising: evaluating a future condition of the communication link according to at least one communication parameter or at least one communication event to obtain an evaluation result; and sending a first indication to the application processor to inform the application processor of the evaluation result. Responsive to reception of the first indication, the application processor is further configured to perform operation comprising: adapting a codec for multimedia processing of data received from the network device.

According to an embodiment of the invention, a method for multimedia adaptation in a communication apparatus communicating with a network device in a wireless network via a communication link, comprising: evaluating, by a modem processor of the communication apparatus, a future condition of the communication link according to at least one communication parameter or at least one communication event to obtain an evaluation result; sending, by the modem processor, a first indication to an application processor of the communication apparatus to inform the application processor of the evaluation result; and adapting, by the application processor, a codec for multimedia processing of data received from the network device responsive to reception of the first indication.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
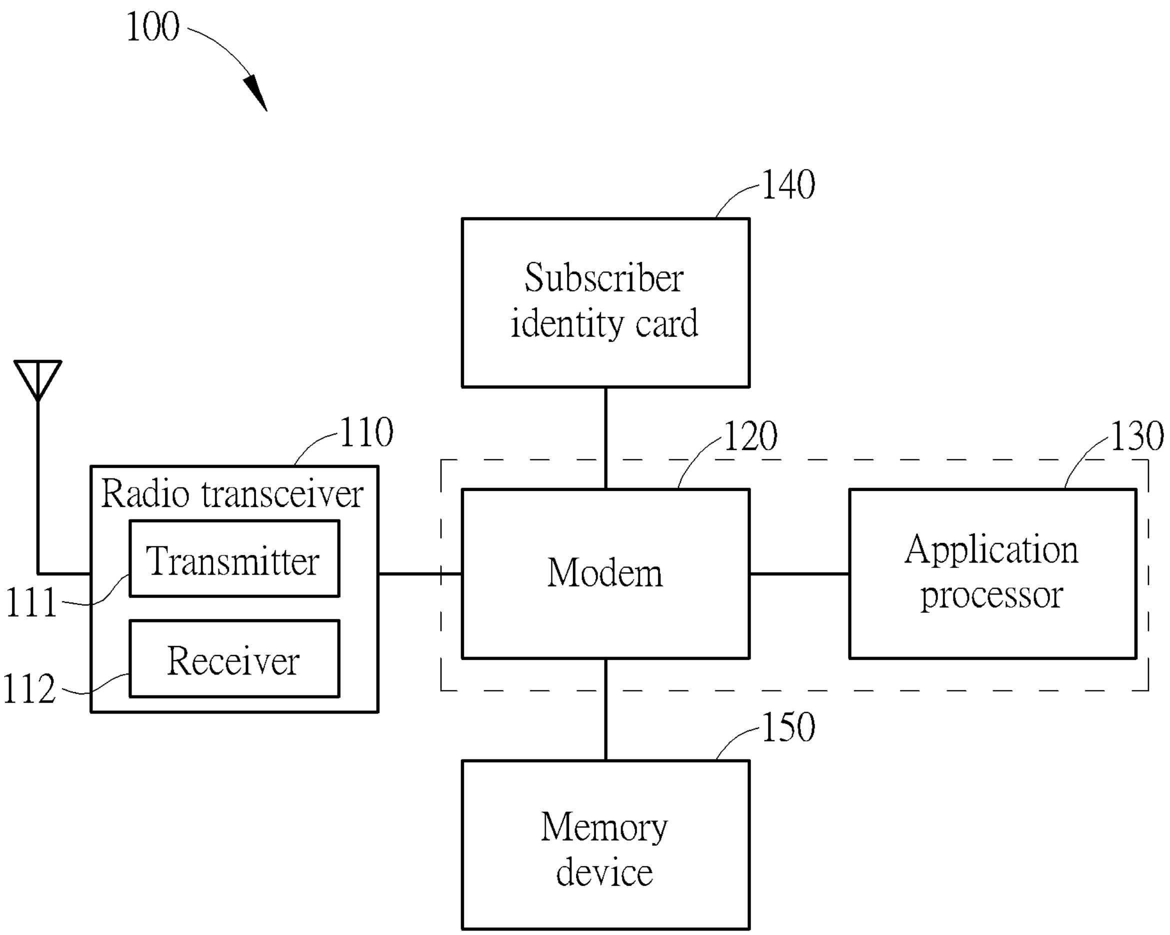
FIG. 1 shows an exemplary block diagram of a communication apparatus according to an embodiment of the invention.

FIG. 1 shows an exemplary block diagram of a communication apparatus according to an embodiment of the invention. The communication apparatus 100 may be a portable electronic device, such as a Mobile Station (MS, which may be interchangeably referred to as User Equipment (UE)). The communication apparatus 100 may comprise at least an antenna module comprising at least one antenna, a radio transceiver 110, a modem 120, an application processor 130, a subscriber identity card 140, and a memory device 150. The radio transceiver 110 may be configured to transmit and/or receive wireless signals to and/or from a network device (e.g. the network device 350 shown in FIG. 3) in a wireless network via the antenna module, so as to communicate with the network device via a communication link established between the communication apparatus 100 and the network device. The radio transceiver 110 may comprise a receiver 112 configured to receive wireless signals from the air interface and a transmitter 111 configured to transmit wireless signals to the air interface, and the radio transceiver 110 may be further configured to perform RF signal processing. For example, the receiver 112 may convert the received signals into intermediate frequency (IF) or baseband signals to be processed, or transmitter 111 may receive the IF or baseband signals from the modem 120 and convert the received signals into wireless signals to be transmitted to the network device in the wireless network or in an access network (e. g. a cellular network or a wireless local access network). According to an embodiment of the invention, the network device may be a cell, a node B, an evolved node B (eNB), a g node B (gNB), a base station, a Mobility Management Entity (MME), an Access and Mobility Management Function (AMF) device, an access point (AP), etc., at the network side and communicating with the communication apparatus 100 by the wireless signals via the communication link.

The transmitter 111 and the receiver 112 of the radio transceiver 110 may comprise a plurality of hardware devices to perform radio frequency (RF) conversion and RF signal processing. For example, the transmitter 111 and/or the receiver 112 may comprise a power amplifier for amplifying the RF signals, a filter for filtering unwanted portions of the RF signals and/or a mixer for performing radio frequency conversion. According to an embodiment of the invention, the radio frequency may be, for example, the frequency of any specific frequency band for a LTE system, or the frequency of any specific frequency band for a 5G NR system, the frequency of any specific frequency band for a WiFi system, etc.

The modem 120 may be configured to handle corresponding communications protocol operations and processing the IF or baseband signals received from or to be transmitted to the radio transceiver 110. The application processor 130 is configured to run the operating system of the communication apparatus 100 and run application programs installed in the communication apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM, USIM, R-UIM or CSIM card, or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communication apparatus may further comprise some peripheral devices not shown in FIG. 1. In another example, in some embodiments of the invention, the communication apparatus may further comprise a central controller coupled to the modem 120 and the application processor 130. Therefore, the invention should not be limited to what is shown in FIG. 1.

In some embodiments of the invention, the communication apparatus is capable of supporting multiple radio access technologies (RATs) communications via the single-card structure as shown in FIG. 1. It should be noted that, although FIG. 1 shows a single-card application, the invention should not be limited thereto. For example, in some embodiments of the invention, the communication apparatus may comprise multiple subscriber identity cards to support the multi-RATs communications, in either a single-standby or a multiple-standby manner. In the multi-RATs communications applications, the modem, the radio transceiver and/or the antenna module may be shared by the subscriber identity card(s) and may have the capability of handling the operations of different RATs and processing the corresponding RF, IF or baseband signals in compliance with the corresponding communications protocols.

In addition, those who are skilled in this technology can still make various alterations and modifications based on the descriptions given above to derive the communication apparatuses comprising multiple radio transceivers and/or multiple antenna modules for supporting multi-RAT wireless communications without departing from the scope and spirit of this invention. Therefore, in some embodiments of the invention, the communication apparatus may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be virtual cards, such as individual identifiers, numbers, addresses, or the like which are burned in the internal memory device of the corresponding modem and are capable of identifying the communication apparatus. Therefore, the invention should not be limited to what is shown in the figures.

It should be further noted that in some embodiments of the invention, the communication apparatus may further support multiple IMSIs.

Figure 2:
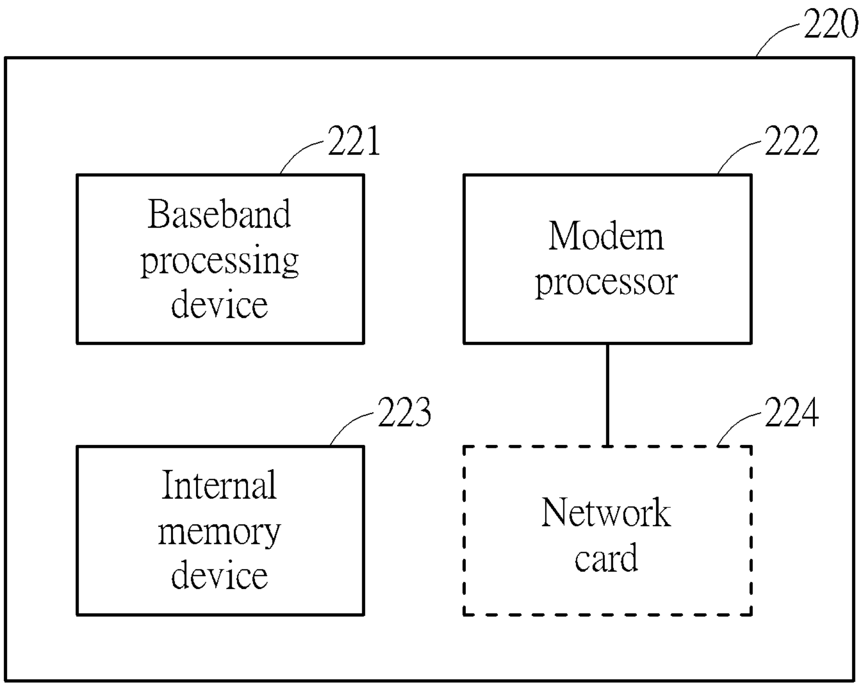
FIG. 2 shows an exemplary block diagram of a modem according to an embodiment of the invention.

FIG. 2 shows an exemplary block diagram of a modem according to an embodiment of the invention. The modem 220 may be the modem 120 shown in FIG. 1 and may comprise at least a baseband processing device 221, a processor 222 (to discriminate from the "application processor" shown in FIG. 1, hereinafter named the "modem processor"), an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different RATs and processing the corresponding IF or baseband signals in compliance with the corresponding communications protocols, so as to support the multi-RAT wireless communications. According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communications protocols, so as to support the multi-RAT wireless communications. Therefore, the invention should not be limited to any specific way of implementation.

The modem processor 222 may control the operations of the modem 220. According to an embodiment of the invention, the modem processor 222 may be arranged to execute the program codes of the corresponding software module of the modem 220. The modem processor 222 may maintain and execute the individual tasks, threads, and/or protocol stacks for different software modules. In an embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The modem processor 222 may also read data from the subscriber identity card coupled to the modem, such as the subscriber identity card 140, and write data to the subscriber identity card. The internal memory device 223 may store system data and user data for the modem 220. The modem processor 222 may also access the internal memory device 223.

The network card 224 provides Internet access services for the communication apparatus. It should be noted that, although the network card 224 shown in FIG. 2 is configured inside of the modem, the invention should not be limited thereto. In some embodiments of the invention, the communication apparatus may also comprise a network card configured outside of the modem, or the communication apparatus may also be coupled to an external network card for providing Internet access services. In some embodiments of the invention, the network card 224 may be a virtual network card, instead of a tangible card, that is created by the operating system of the communication apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the modem may also comprise more than one processor and/or more than one baseband processing device. For example, the modem may comprise multiple processors and/or multiple baseband processing devices for supporting multi-RAT operations. Therefore, the invention should not be limited to what is shown in FIG. 2.

It should be further noted that in some embodiments of the invention, the baseband processing device 221 and the modem processor 222 may be integrated into one processing unit, and the modem may comprise one or multiple such processing units, for supporting multi-RAT operations. Therefore, the invention should not be limited to what is shown in FIG. 2.

According to an embodiment of the invention, the modem processor 222 and the application processor 130 may comprise a plurality of logics, each, designed for handling one or more functionalities. The logics may be configured to execute the program codes of one or more software and/or firmware modules, thereby performing the corresponding operations. When performing the corresponding operations by executing the corresponding programs, the logics may be regarded as dedicated hardware devices or circuits, such as dedicated processor sub-units. Generally, the modem processor 222 may be configured to perform operations of relative lower protocol layers while the application processor 130 may be configured to perform operations of relative higher protocol layers. Therefore, in some embodiments of the invention, the application processor 130 may be regarded as the upper layer entity or upper layer processing circuit with respect to the modem processor 222 and the modem processor 222 may be regarded as the lower layer entity or lower layer processing circuit with respect to the application processor 130.

Figure 3:
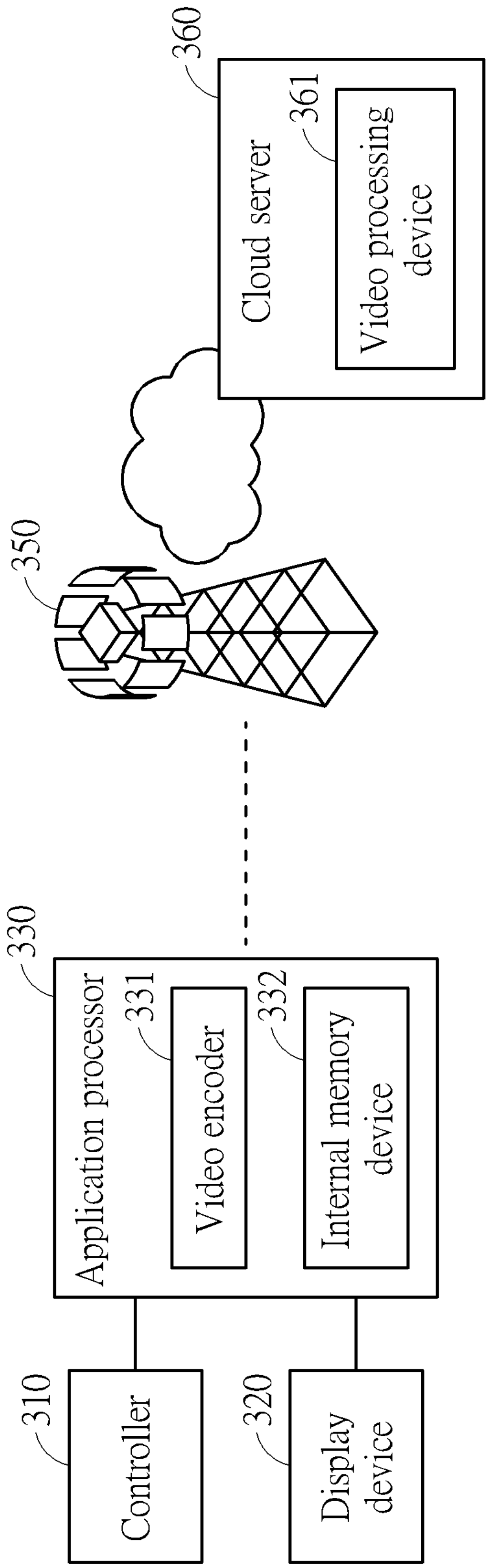
FIG. 3 shows an exemplary block diagram of an application processor according to an embodiment of the invention.

FIG. 3 shows an exemplary block diagram of an application processor according to an embodiment of the invention. The application processor 330 may at least comprise a video encoder 331 configured to process (e.g. encode and decode) multimedia data and an internal memory device 332 for storing data. The application processor 330 may be further configured to drive a controller (e.g. a game controller) 310 and a display device 320 by executing the program codes of corresponding software and/or firmware modules. According to an embodiment of the invention, the controller 310 may be a touch screen of the communication apparatus 100 or an external joystick or joy-con wired or wirelessly connected to the communication apparatus 100 and the display device 320 may be a monitor or a screen of the communication apparatus 100. The application processor 330 may communicate with a cloud server 360 via the communication link established between the communication apparatus 100 and the network device 350 in the wireless network. The cloud server 360 may at least comprise a video processing device 361 configured to process multimedia data, including scene rendering, video capturing, video encoding and decoding, etc. As an example, the cloud server 360 may be an interactive service provider, e.g. a game service provider that provides video rendering of the game, creates the video frame required to play the game, encodes each video frame and transmits one or more packets corresponding to the video frames via the communication link to the communication apparatus 100, and the communication apparatus 100 may be a service receiving device with an application processor (e.g. the application processor 130/330) to run the application program developed for the service and installed in the communication apparatus 100.

It should be noted that, in order to clarify the concept of the invention, FIG. 3 presents simplified block diagrams in which only the elements relevant to the invention are shown. Therefore, the invention should not be limited to what is shown in FIG. 3. It should be further noted that in some embodiments of the invention, the video encoder 331 and/or the video processing device 361 may be implemented as a Graphic Processing Unit (GPU) or may be comprised in a GPU, or, the application processor 330 may further comprise a GPU, and the invention should not be limited to any of these implementations.

In a first aspect of the invention, methods for multimedia adaptation in a communication apparatus during communication interrupt/interruption are proposed. By applying the proposed methods, possible communication interrupt/interruption are predicted or evaluated by the modem processor 222 and the prediction or evaluation is provided to the upper layer entity, e.g. the application processor 130/330, in advance, for the application processor 130/330 to perform adequate multimedia and/or codec adaptation. In this manner, the user experience impact during the communication interrupt/interruption may be reduced or mitigated. In a second aspect of the invention, methods for multimedia adaptation in a communication apparatus based on advanced indications are proposed. By applying the proposed methods, communication or network conditions are predicted or evaluated by the modem processor 222 and the prediction or evaluation is provided to the upper layer entity, e.g. the application processor 130/330, as the advanced indications for the application processor 130/330 to perform adequate multimedia and/or codec adaptation. In this manner, the codec adaptation mechanism is enhanced based on the predictive or advanced indications from the communication lower layer. In a third aspect of the invention, methods for smart handover decision based on the current codec/network status are proposed. By applying the proposed methods, when the multimedia transmission is stable, triggering of some specific handover may be suppressed or avoided. In this manner, unnecessary user experience impact may be prevented.

According to an embodiment in the first aspect of the invention, the modem processor 222 may be configured to perform operations comprising: evaluating a future condition of the communication link according to at least one communication parameter or at least one communication event to obtain an evaluation result; and sending a first indication to the application processor to inform the application processor of the evaluation result. Responsive to reception of the first indication, the application processor 130/330 may be configured to perform operation comprising adapting a codec for multimedia processing of data received from the network device (e.g. the network device 350 or from the cloud server 360 through the network device 350).

In an embodiment of the invention, when the evaluation result shows that an interrupt or an interrupt event of the communication link is to occur (or, is about to occur or will occur), the first indication is an interrupt indication to indicate that an interrupt or an interrupt event of the communication link is to occur.

In an embodiment of the invention, the at least one communication event may be selected from a group comprising handover related events, measurement related events and communication interrupt events due to performance of a radio activity of the another subscriber identity card, and the at least one communication parameter may be selected from a group comprising current or expected data rate, current or expected throughput, current or expected packet error rate, current or expected packet loss rate, current or expected packet delay and current or expected packet jitter with respect to the communication link.

In the embodiments of the invention, the data rate and/or the throughput may be derived based on the recommended bit rate from the network device. As an example, as defined in 3GPP TS 38.321 sub-clause 6.1.3.20, the Recommended bit rate MAC CE is identified by a MAC subheader with LCID for bit rate recommendation message from the gNB to the UE and bit rate recommendation query message from the UE to the gNB, respectively. In addition, in the embodiments of the invention, each packet may be given a timestamp when the sender delivers it, and upon receipt of the packet with the timestamp, the receiver may use the current system time to calculate the packet delay (e.g., the difference between the current time and the timestamp).

In an embodiment of the invention, the modem processor 222 may evaluate or predict a future condition of the communication link according to any received command or any detected event that will trigger a handover procedure. The receipt of the commands or the events that will trigger the communication apparatus 100 to subsequently perform a handover procedure may be regarded as the type of aforementioned handover related events. In the embodiments of the invention, upon receipt of a handover command or before the receipt of a handover command (note that sometimes, the receipt of a handover command is predictable), the modem processor 222 may determine that a handover related event has occurred and determine the future condition of the communication link as that "an interrupt of the communication link is to occur", and the modem processor 222 may send the first indication, which in the first aspect of the invention is an interrupt indication, to the application processor 130/330.

In another embodiment of the invention, the modem processor 222 may evaluate or predict a future condition of the communication link according to the measurement result of a neighboring cell or neighboring network device or according to a measurement report for reporting the measurement result of the neighboring network device, wherein the network device (e.g. the network device 350) currently communicating with the communication apparatus 100 and providing network access services to the communication apparatus 100 may be the serving cell or serving network device. The measurement of neighboring cell or neighboring network device and the reporting of the measurement result may be regarded as the type of aforementioned measurement related events. In the embodiments of the invention, upon sending a measurement report or before sending the measurement report for reporting the measurement result of the neighboring network device, once the modem processor 222 determines that the measurement result may trigger a handover procedure, the modem processor 222 may determine a future condition of the communication link as that "an interrupt of the communication link is to occur", and the modem processor 222 may send the first indication, which in the first aspect of the invention is an interrupt indication, to the application processor 130/330.

Figure 4:
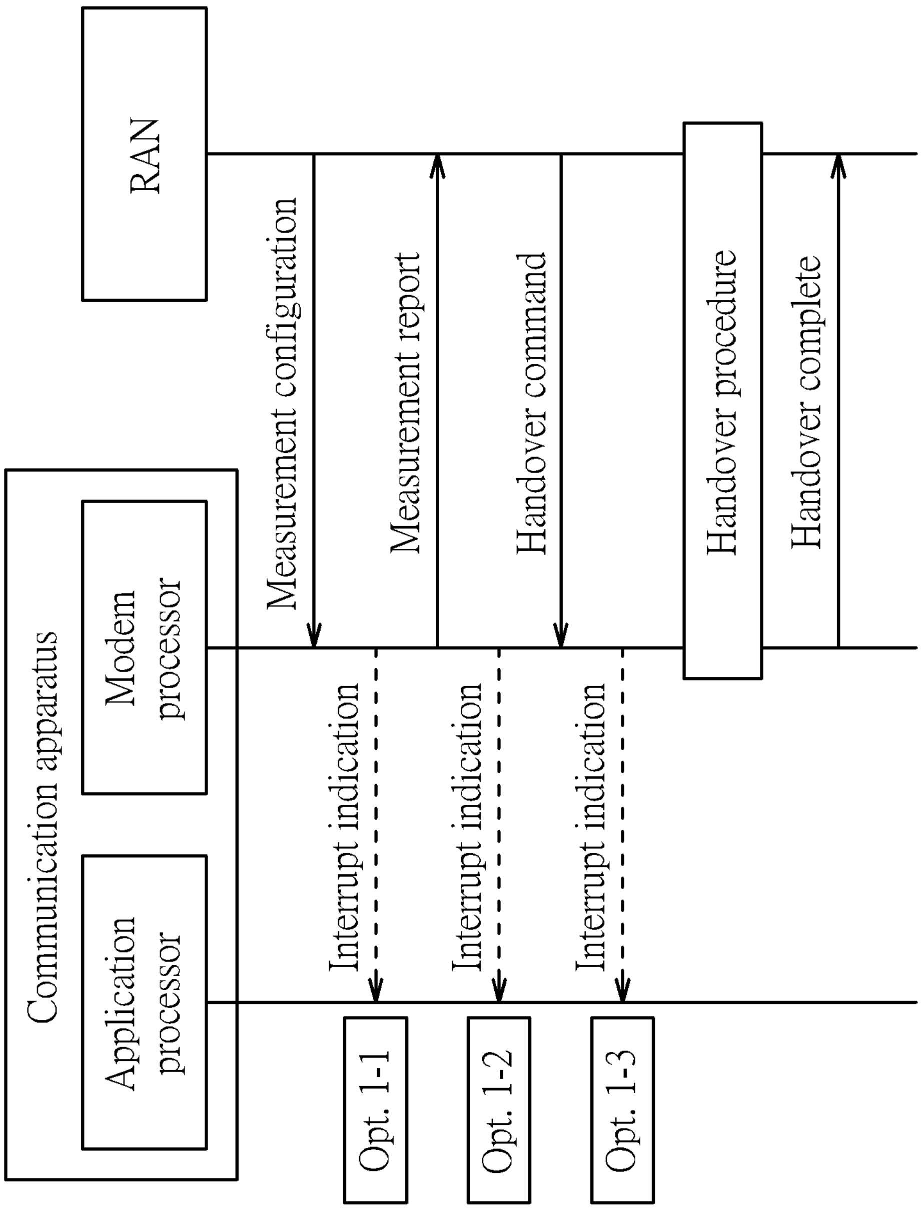
FIG. 4 is an exemplary flow chart showing the message flow between the modem processor and the application processor and the message flow between the communication apparatus and the network device in the radio access network (RAN) according to an embodiment of the invention.

FIG. 4 is an exemplary flow chart showing the message flow between the modem processor and the application processor and the message flow between the communication apparatus and the network device in the radio access network (RAN) according to an embodiment of the invention. The network device in RAN may send a measurement configuration to the communication apparatus (e.g. the communication apparatus 100). In the embodiments of the invention, there may be several options for the modem processor 222 to send the interrupt indication to the application processor 130/330, including at least a first option before the modem processor 222 sending the measurement report to the network device (Opt. 1-1), a second option after the modem processor 222 sending the measurement report to the network device or before receiving the handover command from the network device (Opt. 1-2) and a third option after the modem processor 222 received the handover command or before the modem processor 222 starts the handover procedure (Opt. 1-3). After receiving the handover command and/or transmitting the interrupt indication to the application processor 130/330, the modem processor 222 may start the handover procedure and may then transmit a handover complete message to the network device.

Note that, as specified in the 3GPP standards, the measurement configuration may be carried in the RRCConnectionReconfiguration message with Report Configuration (Triggering Event, Report Interval) and Neighbor Cell List (PCI) information, the measurement report may be carried in RCConnectionReconfigurationComplete message with information regarding serving cell (e.g. Radio Signal Strength (RSI)) and neighbor cell (e.g. PCI, RSI, E-UTRAN Cell Global Identifier (ECGI), Tracking Area Identity (TAI)), the handover command may be carried in the RRCConnectionReconfiguration message including mobiltyControlInfo as well as related reconfigurations, and the handover complete message may be carried in the RCConnectionReconfigurationComplete message.

In another embodiment of the invention, the modem processor 222 may detect or predict a handover event that will trigger a handover procedure (which may be also regarded as the type of aforementioned handover related events) by using measurement result of radio quality of the serving network device and/or the neighboring network device, and/or by leveraging history/statistics of handover events, e.g., if historical/stored records/information indicates that: when an A3 event is reported corresponding to a first serving cell or frequency and a first neighbor cell or frequency, the handover procedure will be triggered by the network to handover from the first serving cell or frequency to the first neighbor cell or frequency, the modem processor 222 may take the reporting of A3 event as a handover event that will trigger a handover procedure. When the A3 event is hit or detected, the modem processor 222 may determine a future condition of the communication link as that "an interrupt of the communication link is to occur", and the modem processor 222 may send the first indication, which in the first aspect of the invention is an interrupt indication, to the application processor 130/330. That is, in the embodiment of the invention, the modem processor 222 may directly detect or predict occurrence of an interrupt event of the communication link based on measurement results, historical/stored records/information and/or inter-RAT measurement.

Figure 5:
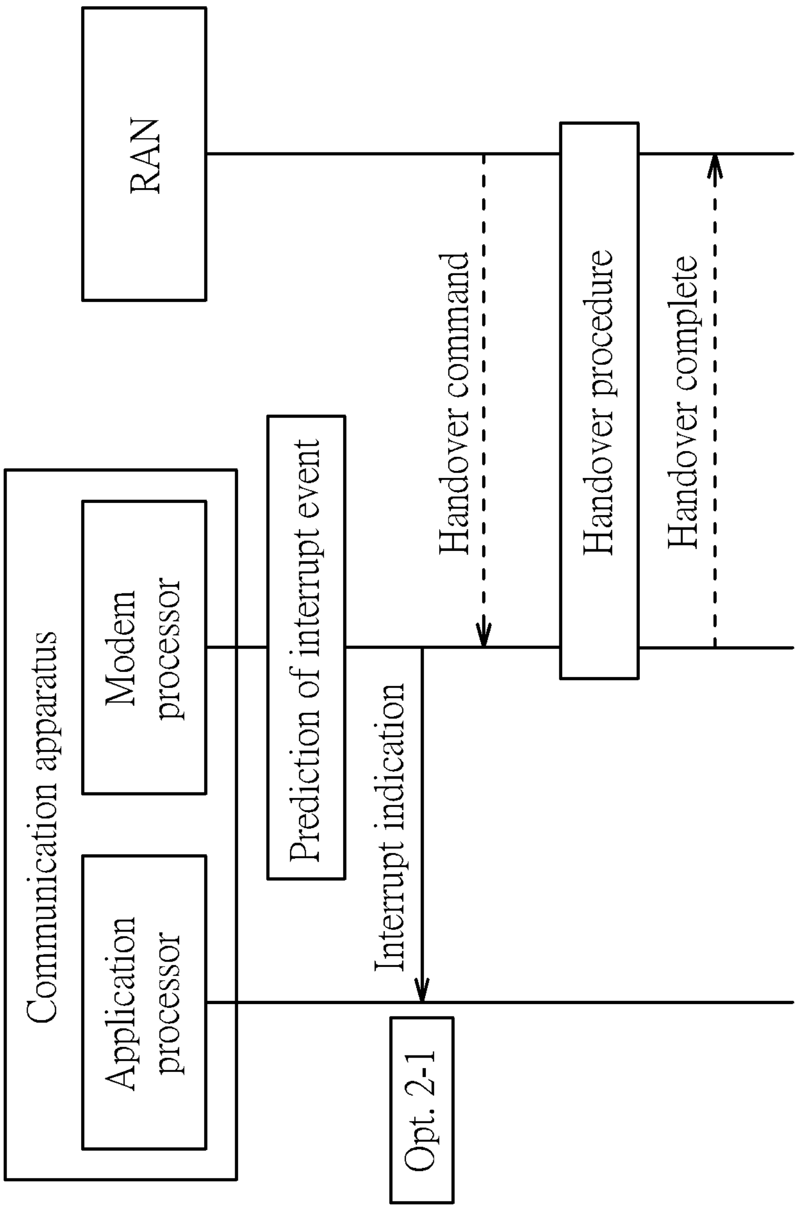
FIG. 5 is an exemplary flow chart showing the message flow between the modem processor and the application processor and the message flow between the communication apparatus and the network device in the RAN according to another embodiment of the invention.

FIG. 5 is an exemplary flow chart showing the message flow between the modem processor and the application processor and the message flow between the communication apparatus and the network device in the RAN according to another embodiment of the invention. Upon prediction of an interrupt event (e.g. the handover related events or measurement related events such as an inter-RAT measurement), the modem processor 222 may send the interrupt indication to the application processor 130/330 (Opt. 2-1). In this embodiment, the modem processor 222 may send the interrupt indication in advance or as early as possible before a possible forthcoming handover command. After receiving the handover command, the modem processor 222 may start the handover procedure and may then transmit a handover complete message to the network device.

In yet another embodiment of the invention, the modem processor 222 may evaluate or predict a future condition of the communication link according to a communication interrupt event due to performance of a radio activity of another subscriber identity card. Suppose that the communication apparatus 100 comprises at least a first subscriber identity card and a second subscriber identity card, which may be dedicated hardware cards or virtual cards as described above, and suppose that the modem processor 222 establishes the communication link with the serving network device (e.g. the network device 350) via the first subscriber identity card, the modem processor 222 may detect an communication interrupt event when a radio activity of the second subscriber identity card is scheduled to be performed. According to an embodiment of the invention, the radio activity of the second subscriber identity card leading to a communication interrupt event may comprise paging reception activities, cell reselection activities, system information block (SIB) reception activities, intra/inter frequency neighbor cell measurement activities, inter radio access technology (RAT) neighbor cell measurement activities, data transmission/reception activities (e.g. tracking area update (TAU) or mobility registration update (MRU)) . . . etc.

Figure 6:
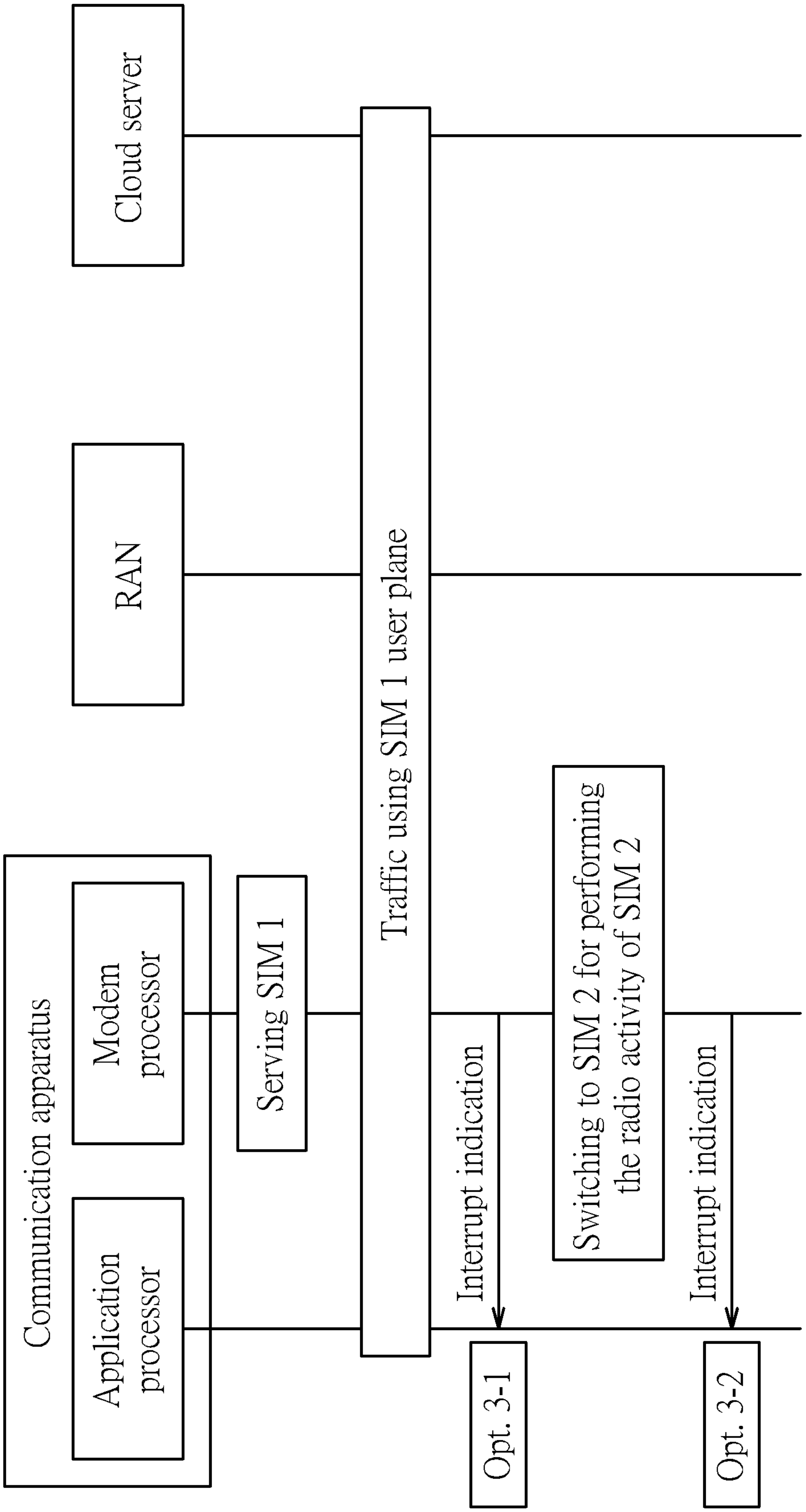
FIG. 6 is an exemplary flow chart showing the message flow between the modem processor and the application processor and the message flow between the communication apparatus and the network device in the RAN according to yet another embodiment of the invention.

FIG. 6 is an exemplary flow chart showing the message flow between the modem processor and the application processor and the message flow between the communication apparatus and the network device in the RAN according to yet another embodiment of the invention. Suppose that the modem processor 222 establishes the communication link with the serving network device (e.g. the network device 350) via SIM 1, SIM 1 may be regarded as a serving SIM (illustrated in FIG. 6 as the serving SIM 1) and there is some traffic between the communication apparatus and the cloud server using SIM 1 user plane, the modem processor 222 may send the interrupt indication to the application processor 130/330 before switching to SIM 2 for the performance of a radio activity of SIM 2 (Opt. 3-1) or after switching to SIM 2 for the performance of a radio activity of SIM 2 (Opt. 3-2).

According to an embodiment of the invention, the modem processor 222 may carry some optional information in the first indication. The optional information may comprise expected time/duration of the communication interrupt or the interrupt event and the expected data rate or expected RAT (e.g., LTE, FR1, FR2) after the communication interrupt or the interrupt event.

According to an embodiment in the first aspect of the invention, the modem processor 222 may further hold the communication link valid for a period of time after obtaining the evaluation result. In an embodiment of the invention, when performing the operation of holding the communication link valid for a period of time, the modem processor 222 may postpone the handover procedure or delay the initiation of the handover procedure (e.g., after receiving the handover command) or postpone the measurement report, or alternatively, send the first indication in advance or as early as possible, e.g., sending the first indication based on the aforementioned evaluation or prediction. To be more specific, in an embodiment of the invention, the modem processor 222 may be further configured to perform operations comprising: starting a timer for holding the communication link valid for the period of time after sending the first indication; and performing a radio activity which leads to the interrupt after the timer expires. One purpose of holding the communication valid for a period of time is to gain some extra time for the application processor 130/330 to negotiate with the cloud server (e.g. the cloud server 360) about the mitigation of the impact to the user during the communication interrupt (e.g. negotiate about the adaptation of the codec for multimedia processing). According to an embodiment of the invention, a length of the period of time may be set to, as an example but not limited to, the round trip time (RTT) from when the communication apparatus sends a message to when it receives a response from the network device.

According to an embodiment of the invention, responsive to reception of the first indication and during the period of time, the application processor 130/330 may perform operations comprising: providing the evaluation result or an interrupt indication to a cloud server; and negotiating with the cloud server about adaptation of the codec for multimedia processing. To mitigate of the impact to the user during the communication interrupt, the application processor 130/330 may adapt a codec for multimedia processing of data received from the network device (e.g. the network device 350 or from the cloud server 360 through the network device 350) according to the evaluation result, locally generate video frames/audio data (e.g., by interpolation/extrapolation), rewind/repeat existing frames, locally play a pre-stored video frames/audio data, e.g., advertisement, or locally play a pre-defined video frames/audio data, e.g., a visual effect, or the likes.

Figure 7:
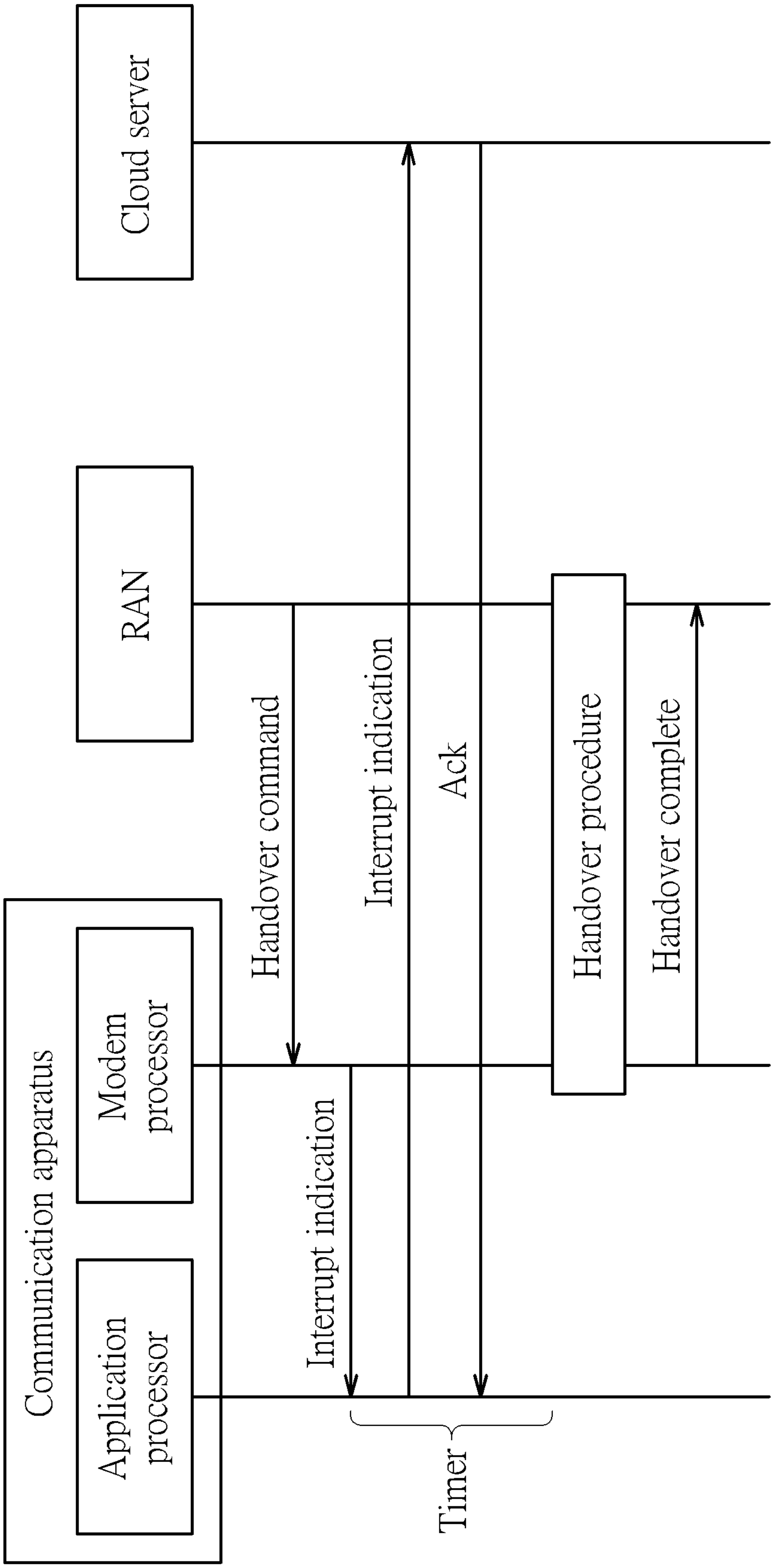
FIG. 7 is an exemplary flow chart showing the message flow between the modem processor and the application processor and the message flow between the communication apparatus and cloud server according to an embodiment of the invention.

FIG. 7 is an exemplary flow chart showing the message flow between the modem processor and the application processor and the message flow between the communication apparatus and cloud server according to an embodiment of the invention. In the embodiment shown in FIG. 7, upon receiving a handover command, the modem processor 222 may send the interrupt indication to the application processor 130/330 before actually performing the handover procedure. The modem processor 222 may start a timer for holding the communication link valid for a period of time after sending the interrupt indication. That is, the modem processor 222 does not start the handover procedure until the timer expires. Upon receiving the interrupt indication, the application processor 130/330 may provide the evaluation result or the interrupt indication to the cloud server to negotiate with the cloud server about adaptation of the codec for multimedia processing. The application processor 130/330 may receive an acknowledge (Ack) message which may comprise information regarding feedback of the codec adaptation and the application processor 130/330 may perform the codec adaptation based on cloud server provisioning. In the embodiments of the invention, the codec adaptation may comprise one or more adjustments on the parameters comprising: a resolution, a frame rate, a compression rate, a number of slices per frames, a Quantization Parameter (QP), a data rate and a frame type. When the timer expires, the modem processor 222 may start the handover procedure and transmit a handover complete message to the network device. Note that H.264 supports advanced intra (spatial) prediction of a macroblock from encoded values for neighboring pixels that have already been encoded, and a difference between the source and prediction signals is called the residual. The residuals are transformed into the spatial frequency domain by an integer transform that approximates the familiar Discrete Cosine Transform (DCT). The Quantization Parameter determines the step size for associating the transformed coefficients with a finite set of steps. Large values of QP represent big steps that crudely approximate the spatial transform, so that most of the signal can be captured by only a few coefficients. Small values of QP more accurately approximate the block's spatial frequency spectrum.

Figure 8:
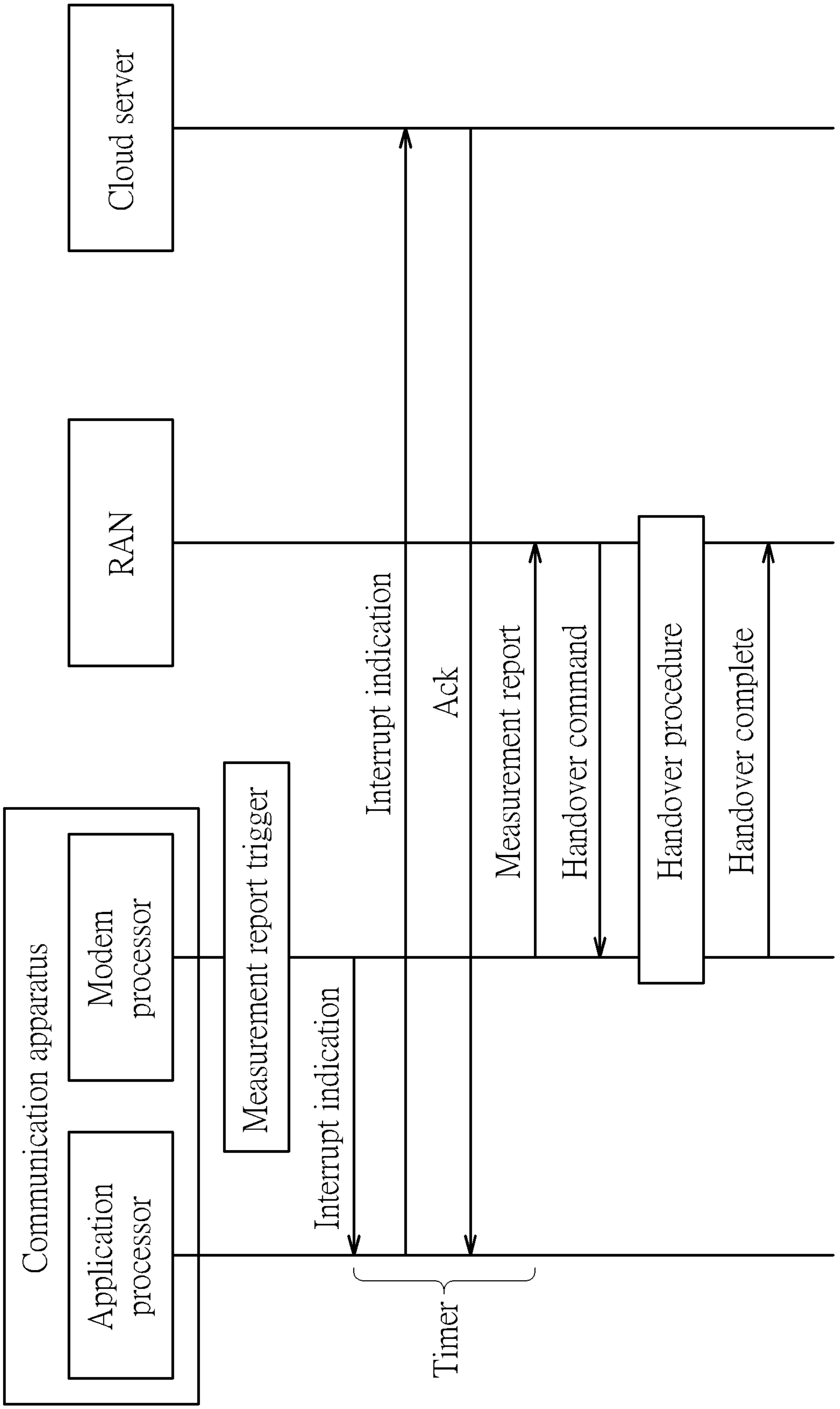
FIG. 8 is an exemplary flow chart showing the message flow between the modem processor and the application processor and the message flow between the communication apparatus and cloud server according to another embodiment of the invention.

FIG. 8 is an exemplary flow chart showing the message flow between the modem processor and the application processor and the message flow between the communication apparatus and cloud server according to another embodiment of the invention. In the embodiment shown in FIG. 8, upon a hit of an event to trigger a measurement report has been detected, the modem processor 222 may send the interrupt indication to the application processor 130/330 before actually performing the measurement report. The modem processor 222 may start a timer for holding the communication link valid for a period of time after sending the interrupt indication. That is, the modem processor 222 does not transmit the measurement report until the timer expires. Upon receiving the interrupt indication, the application processor 130/330 may provide the evaluation result or the interrupt indication to the cloud server to negotiate with the cloud server about adaptation of the codec for multimedia processing. The application processor 130/330 may receive an acknowledge (Ack) message which may comprise information regarding feedback of the codec adaptation and the application processor 130/330 may perform the codec adaptation based on cloud server provisioning. In the embodiments of the invention, the codec adaptation may comprise one or more adjustments on the parameters comprising: a resolution, a frame rate, a compression rate, a number of slices per frames, a Quantization Parameter (QP), a data rate and a frame type. When the timer expires, the modem processor 222 may start the measurement report. When a handover command is received, the modem processor 222 may start a handover procedure and transmit a handover complete message to the network device.

According to an embodiment in the first aspect of the invention, the modem processor 222 may further send a second indication, which may be a resumption indication, to the application processor 130/330 to inform the application processor 130/330 of a resumption of the communication link. In the embodiments of the invention, the modem processor 222 may send the resumption indication upon determining that the interrupt event is avoided or passed, upon sending the handover complete message or upon the actual completion of the handover procedure at the UE side (e.g. the communication apparatus 100). Generally, the handover complete message is transmitted to the target network device for informing that the UE has completed a handover, and the upon receipt of an ACK message from the target network device as a confirmation on the completed handover, the handover procedure may be determined at the UE side as completed.

According to an embodiment of the invention, the modem processor 222 may further carry some extra information in the second indication, comprising the expected data rate or RAT (e.g., LTE, FR1, FR2) after the interrupt event. As an example, the modem processor 222 may carry the expected data rate or RAT based on the capability of the new serving network device (that is, the neighboring network device before performing the handover procedure).

Responsive to the second indication, with the extra information, the application processor 130/330 may adapt a codec for multimedia processing of the data received from the network device, accordingly. As an example, the application processor 130/330 may upgrade or downgrade the codec based on cloud server provisioning according to the extra information obtained from the modem processor 222. As another example, when the codec of the multimedia data is downgraded by the cloud server, the application processor 130/330 may locally up-scale the codec, for example, increase the image resolution from 720p to 1080p. In the embodiments of the invention, the codec adaptation may comprise one or more adjustments on the parameters comprising: a resolution, a frame rate, a compression rate, a number of slices per frames, a Quantization Parameter (QP), a data rate and a frame type.

Note that in the embodiments of the invention, after sending the first indication (e.g. an interrupt indication), the modem processor 222 may keep monitoring and/or determining whether the interrupt event or the interruption is avoided or passed, and when the interrupt event or the interruption is avoided or passed, the modem processor 222 may further send the second indication (e.g. a resumption indication) to the application processor 130/330.

Figure 9:
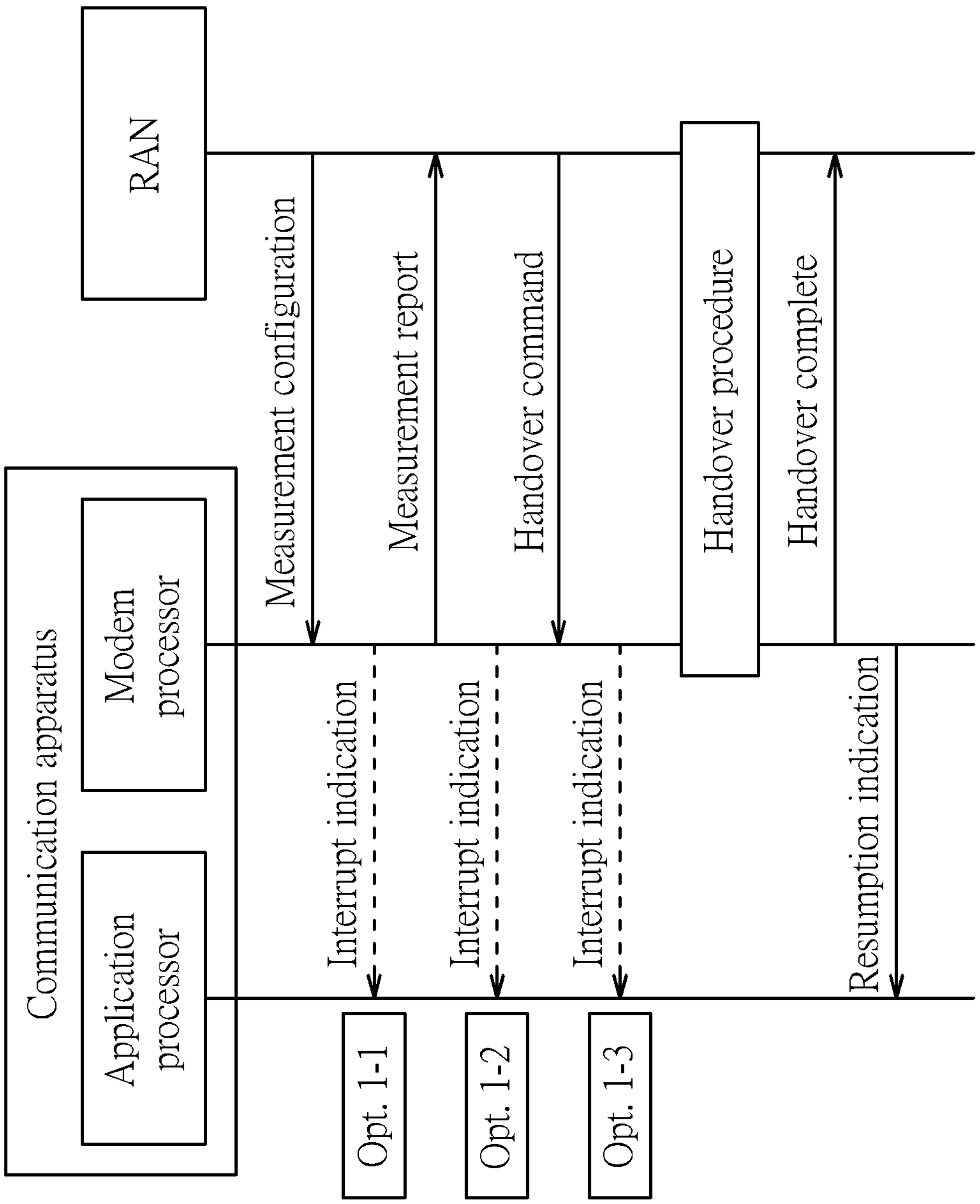
FIG. 9 is an exemplary flow chart showing the message flow between the modem processor and the application processor according to an embodiment of the invention.

FIG. 9 is an exemplary flow chart showing the message flow between the modem processor and the application processor according to an embodiment of the invention. Continuing the embodiment shown in FIG. 4, after transmitting the handover complete message to the network device, the modem processor 222 sends a resumption indication to the application processor 130/330.

Figure 10:
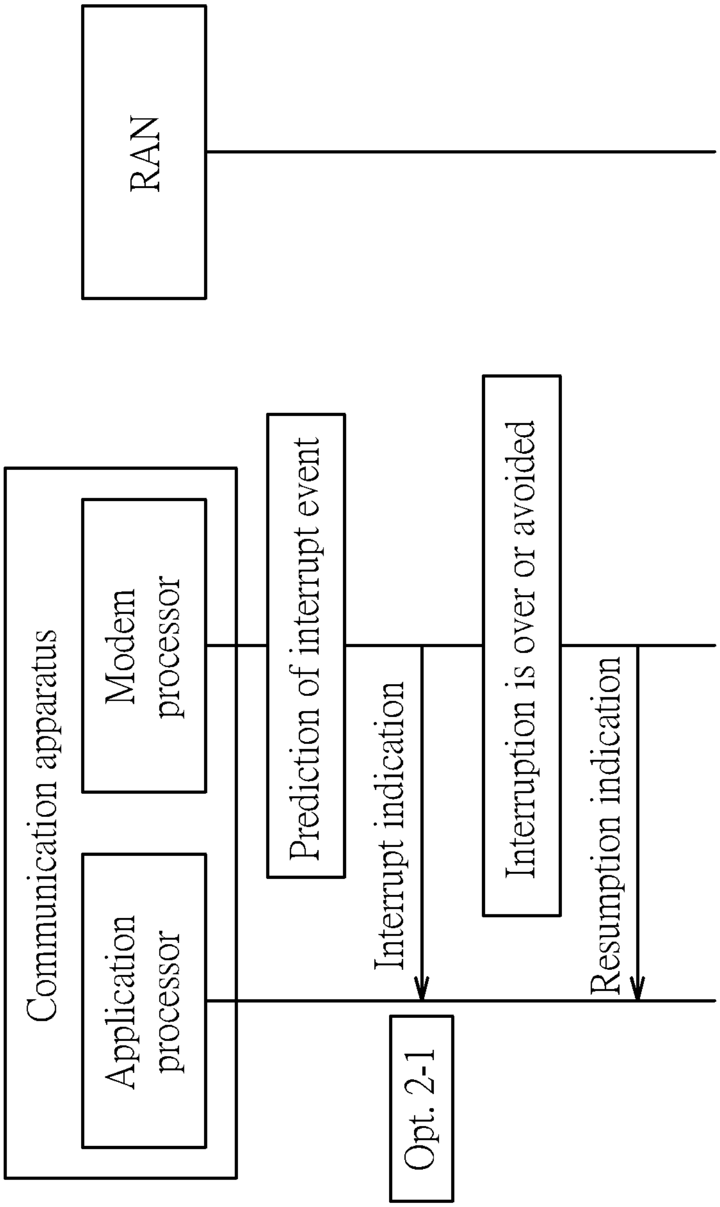
FIG. 10 is an exemplary flow chart showing the message flow between the modem processor and the application processor according to another embodiment of the invention.

FIG. 10 is an exemplary flow chart showing the message flow between the modem processor and the application processor according to another embodiment of the invention. Continuing the embodiment shown in FIG. 5, after send the interrupt indication to the application processor 130/330, the modem processor 222 may keep monitoring and/or determining whether the interruption is over or avoided and send a resumption indication to the application processor 130/330 when the interruption is over or avoided.

By applying the proposed methods in the first aspect of the invention, possible communication interrupt/interruption are predicted or evaluated by the modem processor 222 and the prediction or evaluation is provided to the upper layer entity, e.g. the application processor 130/330, in advance, for the application processor 130/330 to perform adequate multimedia and/or codec adaptation. In this manner, the user experience impact during the communication interrupt/interruption may be reduced or mitigated.

According to an embodiment in the second aspect of the invention, the modem processor 222 may be configured to perform operations comprising: evaluating a future condition of the communication link according to at least one communication parameter or at least one communication event to obtain an evaluation result; and sending a first indication, which is the advanced indication, to the application processor to inform the application processor of the evaluation result. Responsive to reception of the first indication, the application processor 130/330 may be configured to perform operation comprising adapting a codec for multimedia processing of data received from the network device (e.g. the network device 350 or from the cloud server 360 through the network device 350) according to the evaluation result.

In an embodiment of the invention, the at least one communication parameter may be selected from a group comprising the current or expected throughput, the current or expected packet (or slice or frame) error rate, the current or expected packet (or slice or frame) loss rate, the current or expected packet (or slice or frame) delay and the current or expected packet (or slice or frame) jitter, or the likes, with respect to the communication link. The modem processor 222 may evaluate or predict the future condition of the communication link according to at least one of the aforementioned communication parameters and then send an indication to the application processor 130/330 to inform the application processor of the predicted condition or the evaluation result. The modem processor 222 may send the indication in advance for the application processor 130/330 to negotiate with the cloud server (e.g. the cloud server 360) about the adaptation of the codec for multimedia processing.

In the embodiments of the invention, the modem processor 222 may further carry some extra information in the first indication (which in the second aspect of the invention is the advanced indication), comprising the expected time/duration of a forthcoming event that will affect the throughput, the (expected) error rate, the packet (or slice or frame) loss rate, the (expected) packet (or slice or frame) delay, the (expected) packet (or slice or frame) jitter or the likes. In addition, during the negotiation with the cloud server, the application processor 130/33 may optionally provide the information regarding the expected time/duration of the aforementioned forthcoming event, and the expected throughput, the expected packet (or slice or frame) error rate, the expected packet (or slice or frame) loss rate, the expected packet (or slice or frame) delay and the expected packet (or slice or frame) jitter, or the likes, with respect to the communication link, to the cloud server to facilitate the codec adaptation. The application processor 130/330 may receive an acknowledge (Ack) message comprising information regarding feedback of the codec adaptation from the cloud server.

Responsive to reception of the first indication (and in some embodiments, responsive to reception of the Ack message from the cloud server), the application processor 130/330 may adapt the codec for multimedia processing, accordingly. As an example, the application processor 130/330 may upgrade or downgrade the codec based on cloud server provisioning. As another example, when the codec of the multimedia data is downgraded by the cloud server, the application processor 130/330 may locally up-scale the codec, for example, the application processor 130/330 may increase the image resolution from 720p to 1080p. As yet another example, the application processor 130/330 may locally generate video frames/audio data, e.g., by interpolation/extrapolation or locally generate video frames/audio data based the pose/motion/user-input. As yet another example, the application processor 130/330 may rewind or repeat existing frames, locally play a pre-stored video frames/audio data, e.g., advertisement, or locally play a pre-defined video frames/audio data, e.g., a visual effect.

By applying the proposed methods in the second aspect of the invention, communication or network conditions are predicted or evaluated by the modem processor 222 and the prediction or evaluation is provided to the upper layer entity, e.g. the application processor 130/330, as the advanced indications for the application processor 130/330 to perform adequate multimedia and/or codec adaptation. In this manner, the codec adaptation mechanism is enhanced based on the predictive or advanced indications from the communication lower layer.

Figure 11:
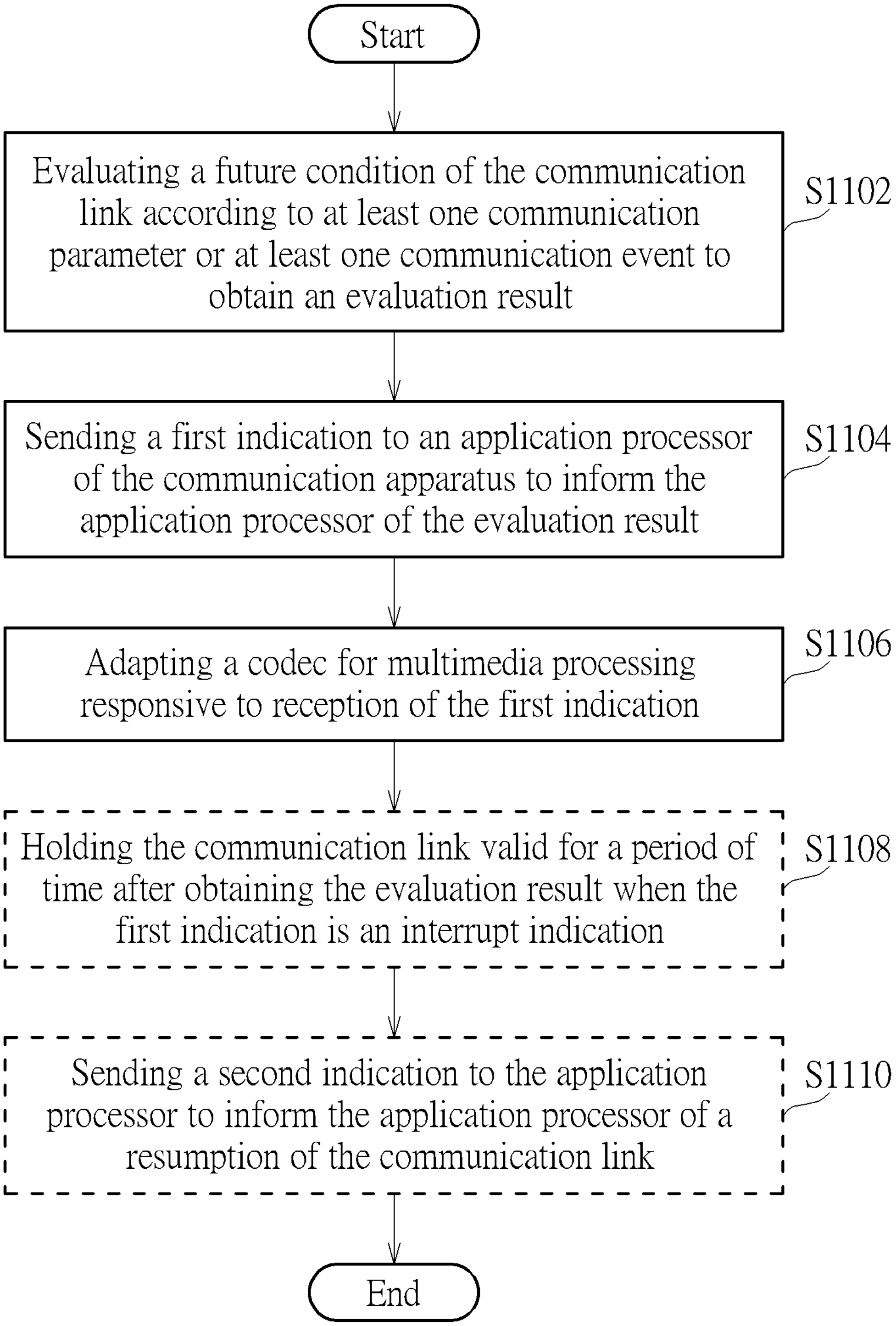
FIG. 11 shows a flow chart of a method for multimedia adaptation in a communication apparatus communicating with a serving network device in a wireless network via a communication link according to an embodiment of the invention.

FIG. 11 shows a flow chart of a method for multimedia adaptation in a communication apparatus communicating with a serving network device in a wireless network via a communication link according to an embodiment of the invention. The method may comprise the following steps:

Step S1102: evaluating, by a modem processor of the communication apparatus, a future condition of the communication link according to at least one communication parameter or at least one communication event to obtain an evaluation result.

Step S1104: sending, by the modem processor, a first indication to an application processor of the communication apparatus to inform the application processor of the evaluation result.

Step S1106: adapting, by the application processor, a codec for multimedia processing responsive to reception of the first indication.

In some embodiment of the invention, the method may optionally comprise the following steps:

Step S1108: holding, by the modem processor, the communication link valid for a period of time after obtaining the evaluation result when the first indication is an interrupt indication.

Step S1110: sending, by the modem processor, a second indication to the application processor to inform the application processor of a resumption of the communication link.

Note that in the embodiments of the invention, the multimedia and/or codec adaptation may be applied to DL direction or UL direction or bi-direction. In addition, the multimedia and/or codec adaptation may be controlled by the network side (e.g. a traffic control logic or a codec control logic in the network device or in the cloud server, or the video processing device 361 as shown in FIG. 3) or UE side (e.g. a traffic control logic or a codec control logic in the communication apparatus, or the video encoder 331 as shown in FIG. 3).

Note further that in the embodiments of the invention, modem information and/or AP information may be actively provided to the cloud server to facilitate the multimedia and/or codec adaptation. The modem information may be selected from a group comprising the aforementioned interrupt indication and advanced indication as described above, and the AP information may be selected from a group comprising battery life (or Power consumption) information, thermal information and environmental information (e.g., light, . . . etc.).

Different from the traditional codec adaptation which is performed based on passed event or information, in the embodiments of the invention, the multimedia and/or codec adaptation may be performed based on the evaluated or predicted future network condition. With the evaluated or predicted information, the modem information and/or the AP information, the multimedia and/or codec adaptation may be more suitable for the communication apparatus 100 and the user experience may be much improved.

In the third aspect of the invention, methods for smart handover decision based on the current codec/network status are proposed. According to an embodiment in the third aspect of the invention, the modem processor 222 may be configured to perform operations comprising: evaluating the codec used for the multimedia processing; defining a threshold value for one or more parameters of the codec in-use, determining whether a current value of the parameter of the codec in-use is greater than or equal to the pre-defined threshold. When the determination result is yes, the modem processor 222 may refrain from triggering a handover event. When the determination result is no, the modem processor 222 may proactively trigger a handover event.

According to an embodiment of the invention, the one or more parameters of the codec for multimedia processing may be selected from a group comprising: a resolution, a frame rate, a compression rate, a number of slices per frames, a Quantization Parameter (QP), a data rate and a frame type, or the likes.

According to an embodiment of the invention, the modem processor 222 may refrain from triggering handover event by postponing a measurement report or sending a measurement report later, as an example, the modem processor 222 may set a timer and does not send an A3 measurement report until the timer expires. According to another embodiment of the invention, the modem processor 222 may refrain from triggering handover event by adjusting the measurement result to be carried in a measurement report to a value that will not trigger a handover procedure and carrying the adjusted measurement result in the measurement report.

According to an embodiment of the invention, the modem processor 222 may proactively trigger handover event by sending a measurement report earlier than a predetermined reporting time. According to another embodiment of the invention, the modem processor 222 may proactively trigger handover event by adjusting the measurement result to be carried in a measurement report to a value that will trigger a handover procedure and carrying the adjusted measurement result in the measurement report.

According to another embodiment of the invention, instead of determining whether a current value of the parameter of the codec in-use is greater than or equal to the pre-defined threshold, the modem processor 222 may determine whether a target network device (e.g. a target cell) is more preferable, as an example, whether a data rate of the target network device is higher than the serving network device or whether the target network device is of a more advanced RAT than the serving network device. When the determination result is yes, the modem processor 222 may proactively trigger a handover event. As an example, the modem processor 222 may proactively trigger handover event by adjusting the measurement result regarding the target network device to be carried in a measurement report to a value that is good enough to trigger a handover procedure and carrying the adjusted measurement result in the measurement report, despite of that the radio condition of the target network device is actually poorer than the serving network device.

By applying the proposed methods in the third aspect of the invention, when the multimedia transmission is stable, triggering of some specific handover may be suppressed or avoided, and when a nearby network device is more preferable, handover may be actively triggered. In this manner, user experience may be much improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication apparatus, comprising:

a radio transceiver, transmitting or receiving wireless signals to or from a network device in a wireless network to communicate with the network device via a communication link;

an application processor, configured to run one or more application programs; and a modem processor, coupled to the radio transceiver and the application processor and configured to perform operations comprising:

evaluating a future condition of the communication link according to at least one communication parameter or at least one communication event to obtain an evaluation result; and before the future condition occurs, sending a first indication to the application processor to inform the application processor of the evaluation result:

wherein responsive to reception of the first indication, the application processor is further configured to perform an operation comprising:

adapting a codec in advance for multimedia processing of data to be received from the network device, wherein the codec is applied when the future condition occurs.

2. The communication apparatus of claim 1, wherein when the first indication is an interrupt indication to indicate that an interrupt of the communication link is to occur, the modem processor is further configured to perform operation comprising:

holding the communication link valid for a period of time after obtaining the evaluation result.

3. The communication apparatus of claim 2, wherein when performing the operation of holding the communication link valid for a period of time, the modem processor is further configured to perform operations comprising:

starting a timer for holding the communication link valid for the period of time after sending the first indication; and performing a radio activity which leads to the interrupt after the timer expires.

4. The communication apparatus of claim 1, wherein when the first indication is an interrupt indication to indicate that an interrupt of the communication link is to occur, the modem processor is further configured to perform operation comprising:

sending a second indication to the application processor to inform the application processor of a resumption of the communication link.

5. The communication apparatus of claim 1, further comprising:

a plurality of subscriber identity cards, comprising a first subscriber identity card and a second subscriber identity card, wherein the modem processor establishes the communication link with the network device via the first subscriber identity card, and the at least one communication event is selected from a group comprising communication interrupt events due to performance of a radio activity of the second subscriber identity card.

6. The communication apparatus of claim 1, wherein when the first indication is an interrupt indication to indicate that an interrupt of the communication link is to occur, the application processor is further configured to perform operation comprising:

locally generating video and/or audio data or locally playing pre-stored video and/or audio data during the interrupt of the communication link.

7. The communication apparatus of claim 1, wherein the at least one communication event is selected from a group comprising handover related events and measurement related events.

8. The communication apparatus of claim 1, wherein the at least one communication parameter is selected from a group comprising expected data rate, expected throughput, expected packet error rate, expected packet loss rate, expected packet delay and expected packet jitter with respect to the communication link.

9. The communication apparatus of claim 1, wherein responsive to reception of the first indication, the application processor is further configured to perform operations comprising:

providing the evaluation result to a cloud server; and negotiating with the cloud server about adaptation of the codec for multimedia processing.

10. The communication apparatus of claim 1, wherein when performing the operation of adapting the codec for multimedia processing of the data received from the network device, the application processor is further configured to perform operations comprising:

adjusting at least one parameter of the codec based on provisioning of the cloud server, wherein the at least one parameter is selected from a group comprising a resolution, a frame rate, a compression rate, a number of slices per frames, a Quantization Parameter (QP), a data rate and a frame type.

11. A method for multimedia adaptation in a communication apparatus communicating with a network device in a wireless network via a communication link, comprising:

evaluating, by a modem processor of the communication apparatus, a future condition of the communication link according to at least one communication parameter or at least one communication event to obtain an evaluation result;

before the future condition occurs, sending, by the modem processor, a first indication to an application processor of the communication apparatus to inform the application processor of the evaluation result;

adapting in advance, by the application processor, a codec for multimedia processing of data to be received from the network device responsive to reception of the first indication; and applying the codec when the future condition occurs.

12. The method of claim 11, wherein when the first indication is an interrupt indication to indicate that an interrupt of the communication link is to occur, the method further comprises:

holding, by the modem processor, the communication link valid for a period of time after obtaining the evaluation result.

13. The method of claim 12, wherein step of holding the communication link valid for a period of time further comprises:

starting a timer for holding the communication link valid for the period of time after sending the first indication; and performing a radio activity which leads to the interrupt after the timer expires.

14. The method of claim 11, wherein when the first indication is an interrupt indication to indicate that an interrupt of the communication link is to occur, the method further comprises:

sending, by the modem processor, a second indication to the application processor to inform the application processor of a resumption of the communication link.

15. The method of claim 11, wherein the communication apparatus comprises a first subscriber identity card and a second subscriber identity card, the modem processor establishes the communication link with the network device via the first subscriber identity card, and the at least one communication event is selected from a group comprising communication interrupt events due to performance of a radio activity of the second subscriber identity card.

16. The method of claim 11, wherein when the first indication is an interrupt indication to indicate that an interrupt of the communication link is to occur, the method further comprises:

locally generating video and/or audio data or locally playing pre-stored video and/or audio data during the interrupt of the communication link by the application processor.

17. The method of claim 11, wherein the at least one communication event is selected from a group comprising handover related events and measurement related events.

18. The method of claim 11, wherein the at least one communication parameter is selected from a group comprising expected data rate, expected throughput, expected packet error rate, expected packet loss rate, expected packet delay and expected packet jitter with respect to the communication link.

19. The method of claim 11, wherein responsive to reception of the first indication, the method further comprises:

providing, by the application processor, the evaluation result to a cloud server; and negotiating, by the application processor, with the cloud server about adaptation of the codec for multimedia processing.

20. The method of claim 11, wherein step of adapting the codec for multimedia processing of the data received from the network device responsive to reception of the first indication further comprises:

adjusting at least one parameter of the codec based on provisioning of the cloud server, wherein the at least one parameter is selected from a group comprising a resolution, a frame rate, a compression rate, a number of slices per frames, a Quantization Parameter (QP), a data rate and a frame type.

21. The communication apparatus of claim 7, wherein the communication event is a handover related event, and the application processor is further configured to evaluate the codec currently used, define a threshold value for at least one parameter of the codec, and compare a value of the at least one parameter with the defined threshold;

wherein when the value is less than the threshold, the application processor is configured to trigger the handover event.

22. The method of claim 17, wherein the communication event is a handover related event, and the method further comprises:

evaluating the codec currently used;

defining a threshold value for at least one parameter of the codec; and comparing a value of the at least one parameter with the defined threshold;

wherein when the value is less than the threshold, the method further comprises:

triggering the handover event.

* * * * *